United States Patent [19]

Webb et al.

[11] 3,790,784

[45] Feb. 5, 1974

[54] METHOD AND APPARATUS FOR TREATING THERMOLUMINESCENT DOSIMETERS DURING READ-OUT TO ENABLE THEIR IMMEDIATE REUSE

[75] Inventors: Geoffrey A. M. Webb, Wantage, England; Howard P. Phykitt, Hillsdale, N.J.

[73] Assignee: Isotopes, Incorporated, Westwood, N.J.

[22] Filed: June 6, 1972

[21] Appl. No.: 260,330

[52] U.S. Cl. .................250/362, 250/473, 250/483
[51] Int. Cl. .............................................. G01t 1/11
[58] Field of Search ...................... 250/71 R, 71.5 R

[56] References Cited

UNITED STATES PATENTS

| | | | |
|---|---|---|---|
| 3,600,583 | 8/1891 | Paynter | 250/71.5 R X |
| 3,603,791 | 9/1971 | Chenault et al. | 250/71 R X |
| 3,657,535 | 4/1972 | Bjarngard et al. | 250/71 R X |

*Primary Examiner*—Archie R. Borchelt
*Attorney, Agent, or Firm*—Martin Fleit et al.

[57] ABSTRACT

A method and apparatus for treating thermoluminescent dosimeters to enable read-out of the dosimeters and to permit their prompt reuse by eliminating the conventional annealing cycle. The dosimeter is initially preheated to a first temperature and is maintained at that temperature for a predetermined time. The dosimeter is then heated to a second read-out temperature and is maintained at the read-out temperature for a selected time interval. The dosimeter is then immediately heated further to an annealing temperature which is maintained for a selected interval, followed by cooling of the dosimeter whereby the dosimeter can again be promptly reused for accurately determining radiation dosage without the necessity of subjecting the dosimeter to the conventional and lengthy annealing cycle.

23 Claims, 3 Drawing Figures

METHOD AND APPARATUS FOR TREATING THERMOLUMINESCENT DOSIMETERS DURING READ-OUT TO ENABLE THEIR IMMEDIATE REUSE

The present invention relates to treatment of thermoluminescent dosimeters, and more particularly to a method and apparatus for reading and annealing thermoluminescent dosimeters within a very short time period, e.g., 1 minute, whereby the dosimeters can be immediately reused. By use of the method and apparatus of this invention, the lengthy and burdensome standard annealing cycle previously required with thermoluminescent dosimeters is eliminated, and dosimeters can now be read-out and placed in condition for reuse within approximately one minute.

In the treatment of thermoluminescent dosimeters, such as lithium fluoride, it has been the practice to read the dosimeters and then to subject the dosimeters to a standard annealing cycle requiring as much as 24 hours for completion. Although this procedure has served the purpose, it has not proved entirely satisfactory under all conditions of service for the reason that the dosimeters are not reusable during the 24-hour time period of the standard annealing cycle. This frequently means that the persons utilizing the dosimeters do not have the benefit of their use for this 24-hour period or that a second set of the dosimeters is required so that the user will always have dosimeters available.

The standard annealing cycle heretofore utilized with lithium fluoride thermoluminescent dosimeters has long been a troublesome feature associated with the use of such dosimeters, and numerous attempts and experiments have been conducted over the years to improve upon the standard annealing cycle. These attempts have all been unsuccessful, and the practice still followed at this writing utilizes the lengthy 24-hour annealing cycle.

It is, therefore, an object of the present invention to provide a method and apparatus for enabling read-out and annealing of thermoluminescent dosimeters within a very short time, such as one minute, so as to enable the prompt reuse of the dosimeters.

Another object is to provide a method of treating lithium fluoride thermoluminescent dosimeters for prompt reuse without the necessity for the lengthy standard annealing cycle heretofore required.

Additional objects and advantages of the invention will be set forth in part in the description which follows, and in part will be obvious from the description or may be learned by practice of the invention. The objects and advantages are realized and attained by means of the steps, instrumentalities, and combinations particularly pointed out in the appended claims.

To achieve these and other objects the present invention provides a method of treating thermoluminescent dosimeters to enable reading of the dosimeters and to permit prompt reuse of the dosimeters, comprising the steps of heating a dosimeter to a predetermined first temperature, maintaining the dosimeter at the first temperature for a predetermined first time interval, heating the dosimeter to a predetermined second temperature, maintaining the dosimeter at the second temperature for a second time interval, immediately increasing the temperature of the dosimeter from the second temperature to a predetermined third temperature to anneal the dosimeter, maintaining the dosimeter at the third annealing temperature for a predetermined third time interval, cooling the dosimeter to a predetermined fourth temperature whereby the dosimeter can again promptly be reused for accurately determining radiation in dosage and measuring the light emissions of the dosimeter during the temperature rise from the first to the second temperature and while the dosimeter is maintained at the second temperature.

As here embodied, the present invention contemplates heating the dosimeter to the first temperature within the range of about 120° C to about 150° C, heating the dosimeter to the second temperature within the range of about 265° C to about 275° C, heating the dosimeter to the annealing temperature within the range of about 300° C to about 310° C and cooling the dosimeter to the fourth temperature within the range of about 100° C to about 120° C.

The heating rates to the first, second, and third temperatures may conveniently be at about 30° C per second, and the mean cooling rate from the third temperature to the fourth temperature may be about 10° C per second with a maximum cooling rate of about 25° C per second from 300° C to 200° C.

As here embodied, the present invention also provides apparatus for treating thermoluminescent dosimeters and includes a dosimeter heating element for receiving and heating dosimeters, a heat detector remotely positioned with respect to the heating element for sensing the temperature of the element, feedback and comparator means in circuit with the heating element and with the heat detector for enabling accurate control of the temperature of the heating element, sequencer and reference program means in circuit with the feedback and comparator means for sequentially controlling the temperature of the heating element in accordance with a predetermined program, and means in operative relationship with the heating element for receiving light energy from a dosimeter heated by the heating element and for displaying information with respect to the irradiated condition of the dosimeter.

Preferably, the apparatus includes a photpmultiplier positioned to receive light energy from the dosimeter positioned on the heating element, converter means in circuit with the photomultiplier to convert an output signal from the photomultiplier to a pulse-train signal, and a display element coupled to the converter means for displaying information relating to the irradiated condition of the dosimeter.

This invention, thus, provides for an important advance in the thermoluminescent dosimeter read-out art and provides a modified read-out and annealing cycle for treating thermoluminescent dosimeters within a very short time period so as to permit the dosimeters to be immediately reused without requiring that the dosimeters be subjected to the lengthy standard annealing cycle of 24 hours.

It is to be understood that both the foregoing general description and the following detailed description are exemplary and explanatory and are not restrictive of the invention.

The accompanying drawings, which are incorporated in and constitute a part of this specification, illustrate an example of a preferred embodiment of the invention and, together with the description, serve to explain the principles of the invention.

Figure 1:
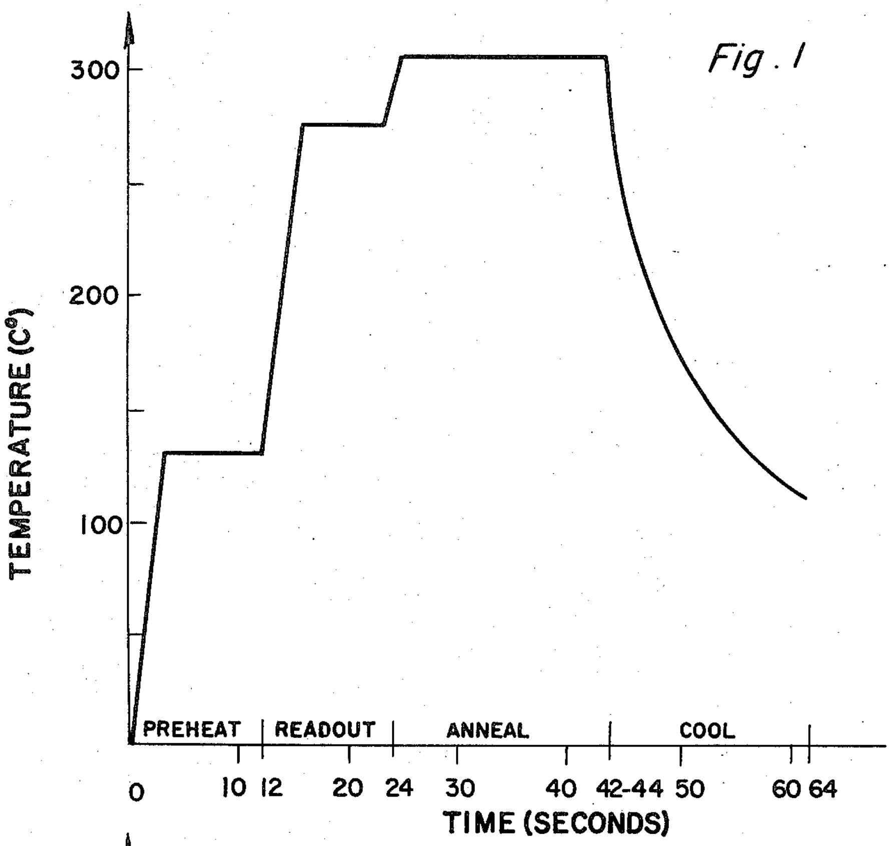
FIG. 1 is a graphical illustration of the treating cycle of this invention.
Figure 2:
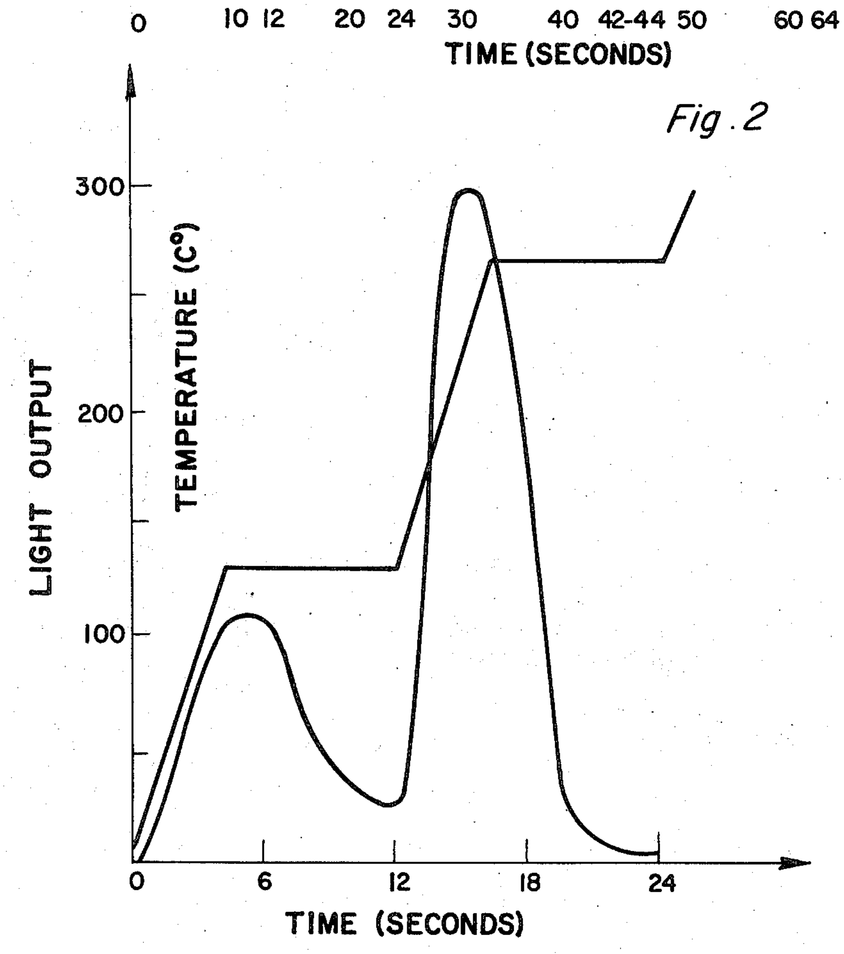
FIG. 2 is a graphical illustration of a portion of the treating cycle of this invention together with an illustration of a glow curve of lithium fluoride taken in accordance with this invention.

The applications of thermoluminescence dosimetry in medical and radiation protection problems are now well established. Although lithium fluoride is the most common phosphor utilized because of its tissue equivalence and good sensitivity, it has suffered from the disadvantage that it requires the longest and most troublesome annealing procedure of all known phosphors before it can be reliably reused.

The standard annealing cycle previously used is comprised of three components. First, the dosimeter is maintained at a high temperature. This is followed by a cooling to 80° C and then by maintaining the dosimeter at this temperature for a period of 24 hours.

This invention replaces all of the components of the standard annealing cycle by modifying the heating cycle during dosimeter read-out, and the modified cycle of this invention includes four stages identified as preheating, read-out, annealing at a high temperature for approximately 20 seconds and cooling rapidly and reproducibly in a nitrogen gas stream. Integration of the light energy emitted by the dosimeter is carried out only during the read-out stage and the other three stages are used solely for annealing. The high temperature anneal zeros the dosimeter, the cooling is highly reproducible and provides for uniform sensitivity of dosimeters and the preheat stage bleaches out the low temperature peaks of the glow curve before integration of the light energy emitted commences.

The high temperature anneal of this invention leaves less than 0.03 percent residual signal, and the reproducible cooling rate brings sensitivities of different batches of dosimeters within ± 5 percent by cycling once through the read-out cycle. The performance of the preheat stage has been studied by glow curve analysis and by fading studies, and the modified cycle of this invention has been found to dramatically replace the standard annealing cycle for most applications and especially at low dose levels.

In order to enable a clear understanding of the modified cycle of this invention, the standard annealing cycle will be discussed and compared with pertinent portions of the modified cycle of the invention. The performance of the modified cycle in eliminating the need for the standard annealing cycle will also be examined.

THE CONVENTIONAL OR "STANDARD" ANNEALING CYCLE FOR LITHIUM FLUORIDE DOSIMETERS

Thermoluminescence dosimetry was put into use as a dosimetry technique long before satisfactory theoretical explanations of the behavior of various phosphors were available. As a result, certain procedures which seemed necessary to obtain good results assumed an aura of magic. A good example is the so-called "standard" anneal. This procedure was followed for years before substantial justification for it was available and the significance of the various parameters explained. Even now a completely satisfactory theoretical explanation for all facets of the behavior of lithium fluoride is not agreed upon. However, further work has produced the phenomenological explanations given infra for the effects of the different portions of the "standard" cycle, which this invention replaces.

HIGH TEMPERATURE STEP OF THE "STANDARD" ANNEAL FOR LITHIUM FLUORIDE DOSIMETERS

The high temperature "standard" anneal step was originally set as 1½ hours at 400° C, but in practice it is generally reduced to 1 hour at 400° C. This portion of the "standard" annealing procedure has served the basic purpose of erasing the signal remaining from prior irradiations. Upon the introduction of the phosphor-Teflon dosimeter, with its attendant convenience, this procedure was reduced to several hours at 300° C. For most purposes the 300° C anneal is quite adequate and it will remove signals from prior exposure in the kilorad region without difficulty.

The 400° C anneal, however, also accomplishes another purpose in lithium fluoride which is to remove the sensitivity increase from prior irradiations in the superlinear regions above about 1000 R. The removal of this increased sensitivity is a function of the temperature and time of annealing and is further complicated by radiation damage effects above 50,000 R. This means in practice that dosimeters with large cumulative exposure histories may not always be restored to their original sensitivities even by the "standard" high temperature anneal. It may be noted that the stability of the increased sensitivity is different in other phosphors; for example, in $Li_2B_4O_7$:Mn the enhanced sensitivity is normally removed in the read-out cycle.

A further purpose served by the high temperature anneal has been to release the trap distribution in the crystal from that imposed by any previous diffusion process (low temperature anneal). For this 300° C has proved as effective as 400° C.

COOLING STEP IN "STANDARD" ANNEAL FROM HIGH TEMPERATURE TO LOW TEMPERATURE

It was not originally realized that the cooling rate from the high temperature of the "standard" anneal had a significant effect on the subsequent sensitivity of lithium fluoride phosphor. This has been studied by various groups with substantial agreement that rapid cooling gives an increase in the overall sensitivity in all glow curve peaks. It has been determined that above a cooling rate of about 100° C/minute the heights of the two high temperature peaks of the lithium fluoride glow curve remain substantially constant, but there is a continued increase in the relative heights of the low temperature peaks. The increase in sensitivity found between the cooling rate for a typical annealing oven (5° C/minute) and a fast cool (greater than 100° C/minute) is about 30 percent for the highest temperature peak. The slope of the sensitivity versus cooling rate curve is greatest in the region where most ovens operate and partially accounts for the sensitivity differences generally observed when dosimeters are annealed in an oven.

LOW TEMPERATURE ANNEAL STEP IN THE "STANDARD" ANNEAL CYCLE

In the "standard" annealing procedure, the cooling step is followed by maintenance at 80° C for 24 hours, and this procedure, prior to this invention, has withstood the test of time and many studies. In direct opposition to this invention, these studies have concluded that 80° C is the most desirable temperature and that a shorter time at a higher temperature does not produce the same desirable effect. The effect produced by this low temperature anneal is a distribution of the trapping centers in the lithium fluoride to favor the high temperature traps used in dosimetery. It has also been shown in the prior art that the time of 24 hours in the low temperature "standard" anneal of lithium fluoride is not critical and any convenient time between 10 and 50 hours is suitable.

An alternate to the 80° C pre-irradiation "standard" anneal has long been recognized in a post-irradiation but pre-read-out anneal at 80° C or 100° C for 10–20 minutes. This has no effect on the trap distribution but merely empties the low temperature and more unstable traps before read-out. Its principal disadvantage has been that it cannot be carried out in bulk for a large number of dosimeters but has had to be given to a few at a time after their irradiation.

The modified read-out and anneal cycle of the present invention dramatically shortens the time for dosimeter read-out and annealing. This invention replaces the lengthy treatment previously required by the "standard" anneal by a very much shorter treatment that can be carried out in the read-out instrument and which results in very small changes in dosimeter sensitivity between read-outs so that the lithium fluoride dosimeter can be repeatedly reused in a reliable manner without the necessity for "standard" annealing treatment external of the read-out instrument.

THE READ-OUT AND ANNEAL CYCLE OF THIS INVENTION

The method of this invention is a seven-stage heating and cooling treatment of thermoluminescent dosimeters, and this treatment is performed by and within a read-out instrument. The method of this invention has proved to be very successful to the extent of eliminating the requirement for the lengthy and troublesome "standard" anneal cycle. The high temperature anneal step of this invention leaves less than 0.03 percent residual signal, and the reproducible cooling rate of this invention brings sensitivity to different batches of dosimeters within ± 5 percent by cycling once through the read-out cycle.

The method of this invention is graphically illustrated in FIG. 1 and includes the following steps:

1. The temperature of the dosimeter is raised rapidly to a temperature within the range of 120° C to 150° C at about 30° C per second (preheat).

2. The temperature is maintained at a constant value within this temperature range, preferably at 135° C, for eight seconds (preheat).

3. The temperature is again raised to a predetermined temperature within the range of from 265° C to 275° C for lithium fluoride at about 30° C per second (read-out).

4. The temperature of the dosimeter is maintained within this range, preferably at 270° C, for eight seconds (read-out).

5. The temperature of the dosimeter is again raised to a predetermined level within the range of from 300° C to 310° C at about 30° C per second (anneal).

6. The temperature of the dosimeter is maintained within this range, preferably at 305° C, for nineteen seconds (anneal).

7. The dosimeter is allowed to cool in a nitrogen flow of, for example 7SCFH, to a temperature of from 100° C to 120° C, and preferably to a temperature of 110° C. The mean cooling rate is preferably 10° C per second with a maximum rate of 25° C per second from 300° C to 200° C.

Integration of the light energy emitted by the dosimeter is performed only during stages 3 and 4, and the remaining stages are solely for annealing of the dosimeter to enable its immediate reuse. In addition, stages 5 and 6 of the cycle of this invention replace the high temperature "standard" annealing step previously required. Stage 7 of this invention assures a fast, reproducible cooling rate, and stages 1 and 2 replace the low temperature "standard" annealing step. Thus, the cycle of this invention provides for read-out and annealing of thermoluminescent dosimeters so as to permit immediate reuse within approximately one minute as compared to the 24-hour procedure previously required by use of the "standard" annealing cycle.

The selection of the optimum preheat temperature in the cycle of this invention is the area in which the greatest conflict of requirements is experienced. This is because the preheat stage is for the purpose of eliminating, to the greatest extent possible, the low temperature glow curve peaks of the phosphor while leaving untouched the high temperature peaks. In addition, there is the further complication of the sensitivity of the dosimeter to ultra-violet light, which is also affected by the preheat temperature. Thus, in determining the nature of the preheat stage of the method herein described, it was determined that the temperature should be high enough to efficiently remove the low temperature glow curve peaks and that it should also be high enough to remove signals induced in the phosphor material (lithium fluoride) by ultra-violet light rather than nuclear radiation. However, the preheat temperature must also be low enough so as not to remove any significant signal from the main or high temperature glow curve peak. As a result of these considerations, it was determined that the best temperature range for the preheat stage is 120° C to 150° C whereby the total preheat stage occurs for 12 seconds and wherein the dosimeter is preferably held at 135° c for 8 seconds of the 12 seconds.

Selection of the read-out temperature for lithium fluoride was governed by the basic principle of minimizing the residual after read-out occurs. In the method of this invention, the relatively long hold at the read-out temperature makes it possible for very efficient release of trapped electrons at temperatures well below those giving incondescence.

Table 1 below shows the second reading from LiF-Teflon disc dosimeters given 100,000 mR, read once and allowed to cool before rereading for different read-out temperatures. Also shown are the readings from unirradiated dosimeters expressed in mR equivalent. These were taken with no background subtraction in the reader so they include dark current, noise, incandescence emission, background radiation and spurious luminescence. The preheat temperature used in these measurements was 135°, but the dosimeters had been given a standard anneal with 19 hours at 80° C before irradiation to minimize the contribution from low temperature peaks. This was necessary in this procedure to avoid confusing the results.

TABLE 1

| Read-Out Hold Temperature | 2nd Reading | Unirradiated Dosimeter Rdg. mR Equiv. |
|---|---|---|
| 230 | 5.4 | 14 |
| 250 | 0.70 | 15 |
| 265 | 0.48 | 16 |
| 275 | 0.35 | 18 |
| 290 | 0.28 | 45 |
| 330 (Dosimeter Melted) | 0.22 | 66 |

It is apparent from Table 1 that the relatively simple criterion of looking for a minimum in the second readings is not sufficient, as this is at a very high temperature and is accompanied by an increase in the background.

The temperature selected was 270 ± 5° C as it appears that this gives efficient read-out with a relatively low unirradiated dosimeters reading. Also slight changes from the setting did not appear to affect the performance greatly in this region. The 270° C setting was also found to give less than 1 percent residual and relatively low backgrounds for all other LiF-Teflon dosimeters including thin dosimeters and microrods. The instrument of this invention, described infra, has preset temperatures for standard LiF-Teflon dosimeters and it is this preset read-out temperature that is set to 270° C. In manual mode the operator has full control of the read-out temperature from 150°–350° C.

The selection of the anneal temperature for this invention and the time interval was governed by the need to remove residual signal without melting LiF-Teflon dosimeters. It was found that a temperature of 305° C for about nineteen seconds resulted in a residual signal less than 0.03 percent and that an anneal temperature within the range of 300° C to 310° C was practicable.

Table 2 shows the residual signal remaining after a 20 second anneal at different anneal temperatures. The choice of 20 seconds as the time is determined by practical considerations.

TABLE 2

| Anneal Temperature Exposure | 500,000mR | 100,000mR | 50,000mR |
|---|---|---|---|
| 300° C | 0.1 percent | 0.05 percent | 0.03 percent |
| 310° C | 0.05 percent | 0.02 percent | 0.02 percent |
| 320° C | 0.03 percent | 0.01 percent | 0.02 percent |

It can be seen that after an exposure of 50,000 mR, the residual signal is less than 15 mR in the worst case. Results for other dosimeters are similar, but loose powder is less efficiently annealed if a 45 mg aliquot is used. The anneal becomes less efficient as the dose is increased. This is attributable to the growth of higher temperature glow peaks at these doses.

If measurements are predominantly in the "Health Physics" range (1–10,000 mR) with occasional excursions to 1,000,000 mR, then a high sensitivity dosimeter must be used such as our Teledyne-Isotopes LiF-Teflon disc 12.7 mm dia × 0.4 mm thick loaded 30 percent weight LiF. This contains about 30 mg lithium fluoride and is correspondingly high in cost. When used with anneal this may be reused indefinitely in this range provided dosimeters above 10,000 mR are discarded or reread. Similar reasoning applies to other relatively expensive dosimeters containing the large quantities of phosphor needed for maximum sensitivity.

The selection of a cooling rate is governed by the need for speed of cooling to give reproducible sensitivity. The cooling is preferably allowed to follow the natural curve as illustrated in FIG. 1. Some of the heat is removed by nitrogen flow, but the majority of the heat flows through beryllium copper current contacts (not shown) which have a very large thermal capacity. The cooling rate is unaffected by changes in the nitrogen flow rate of ± 3CFH from a nominal flow rate of 6CFH. The final temperature after a 20-second cooling period is 110° C ± 10° C and the mean cooling rate is about 10° C per second with a rate of 25° C per second from 300° C to 200° C.

The reproducibility and speed of cooling result in maximum sensitivity for reuse and no change in sensitivity among groups of dosimeters or in a single dosimeter over a number of reuse cycles. Experiments have shown that this invention enables LiF-Teflon dosimeters to be used repeatedly up to 100 times with an overall change in senstivity of 2.8 percent and with a trend change in sensitivity of less than 0.6 percent.

Two LiF-Teflon disc dosimeters were used in conducting such experiments. For convenience they were only given an accurate irradiation every five read-out cycles. The dosimeters were removed from the heating element and replaced for every read-out cycle. Table 3 shows the readings obtained over 100 such reuse cycles. The full anneal cycle was used and the dosimeters were not cleaned for the duration of the experiment. The dose was approximately 1,700 mR.

TABLE 3

Results of 100 reuse cycles on LiF-Teflon disc dosimeters

| | | | | | | | |
|---|---|---|---|---|---|---|---|
| No. of read-out cycles | 5 | 10 | 15 | 20 | 25 | 30 | 35 |
| Reading | 1,686 | 1,706 | 1,706 | 1,673 | 1,671 | 1,815 | 1,731 |
| No. of read-out cycles | 40 | 45 | 50 | 55 | 60 | 65 | 70 |
| Reading | 1,585 | 1,741 | 1,672 | 1,656 | 1,670 | 1,615 | 1,641 |
| No. of read-out cycles | 75 | 80 | 85 | 90 | 95 | 100 | ------- |
| Reading | 1,643 | 1,623 | 1,750 | 1,711 | 1,765 | 1,795 | ------- |
| Mean | | | | 1,693 | | | |
| Standard deviation, percent | | | | ±2.8 | | | |
| Mean of 1st 50 cycles | | | | 1,698 | | | |
| Mean of 2nd 50 cycles | | | | 1,687 | | | |
| Difference, percent | | | | 0.6 | | | |

It can be seen that there is no significant change in sensitivity during the experiment. The standard deviation of all the readings is ± 2.8 percent. The fact that there is no trend in sensitivity is shown by comparing the mean of the first 50 cycles with that of the second 50 cycles; the difference is only 0.6 percent. The background from the dosimeters remained constant at between 5–10 mR throughout the experiment.

Figure 3:
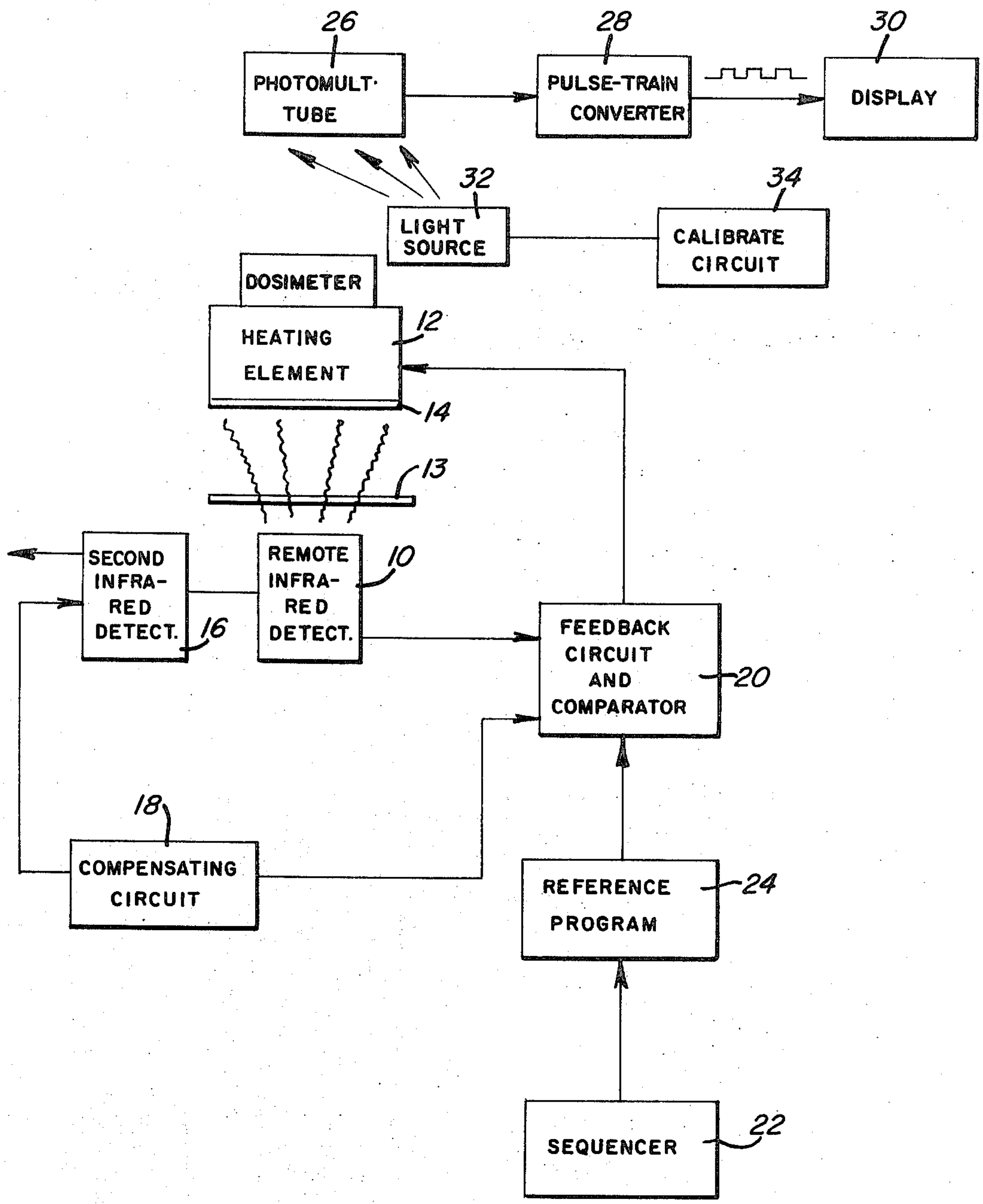
FIG. 3 is a block diagram view of apparatus in accordance with the invention.

A preferred embodiment of the read-out instrument of this invention is illustrated in block diagram form in FIG. 3. The instrument or apparatus of this invention utilizes removable and reusable heating elements and the introduction of the dosimeters into a nitrogen atmosphere during heating as described by McCall in U.S. Pat. No. 3,300,643, and the material set forth in U.S. Pat. No. 3,300,643 is incorporated by reference into this application.

In order to provide for very reliable, long-term control over temperature, an infra-red detector 10, such as a thermistor, is used as the temperature monitoring element. The use of such an infra-red detector provides for superior speed of response as compared with previously used thermocouples and avoids contact problems, moving parts are eliminated and no local cooling of the heating element occurs at the pont of thermocouple contact. The infra-red detector also averages the temperature over an area comparable to that of the dosimeter. The dosimeter sample carriers are preferably removable nichrome elements similar to those used for many years in commercial read-out instruments, such as Teledyne Isotopes Model 7100. In addition, however, these heating elements 12 are blackened on the underside 14 to increase their infra-red emisivity.

Detector 10 is preferably mounted under an Irtran filter 13 and the detector averages the temperature over about one square centimeter area on the underside 14 of heating element 12 immediately below the dosimeter.

A second matched detector 16 may also be mounted within the same enclosure (not shown) with detector 10 to compensate for changes in ambient temperature, and an electronic compensating circuit 18 may also be employed.

The output of detector 10 is used in a feedback manner in conjunction with feedback circuit and comparator 20 to control the temperature of heating element 12. The instrument is controllied by a solid state sequencer 22 together with a reference program 24 which moves the temperature of the heating element through three sequential "ramp" and "hold" stages followed by the cooling period. The heating rate and times are fixed in the sequencer 22 and reference program 24 but the hold temperatures may all be varied between 25° C to 350° C. Because control is by temperature directly, the same temperature is used for all physical forms of dosimeters including loose powders, phosphor Teflon discs, microrods, extrusions, etc.

The light emitted from the dosimeter is detected by photomultiplier tube 26 and the output from this tube is converted by current-to-frequency converter 28 to a pulse train that is fed, in turn, to a counter circuit 30 for display of the integral of the photomultiplier output during the read-out stage. The voltage to multiplier tube 26 may be adjusted between five preset values to give the correct photomultiplier output gain and so that a number of dosimeter forms will indicate directly in dosage units (milliRoentgens or Roentgens) on the output display 30.

An additional feature of the apparatus of this invention provides for light source 32 which may be positioned adjacent photomultiplier tube 26 and in circuit with calibrate circuit 34 whereby the instrument can count the emissions from light source 32 for 2 seconds, for example, and update display 30 every 2 seconds to enable rapid and accurate adjustment of the over-all electronic gain.

It should be understood that variations in the temperatures utilized and in the heating periods are contemplated by this invention. For example, variations in the heating rate between the preheat, read-out and anneal stages may vary from a few degrees Centigrade per second to several hundred degrees Centigrade per second. Complementary variations in the preheat temperature are also contemplated, e.g., use of a lower temperature for a longer time or vice versa can be utilized. Variations in the anneal temperature are also possible, and in particular, it may be raised as high as 400° C for dosimeter embodimetns other than the phosphor-Teflon dosimeters. Variations in the cooling rate are also contemplated provided the cooling rate is reproducible and provided that it is greater than 100° C per minute.

Variations in the manner of obtaining the temperature utilized in the method of this invention are also contemplated. For example, the same effect can be obtained by bringing the dosimeter, in turn, under heated blocks maintained at 135° C, 270° C, 305° C, and 100° C and by lowering the blocks onto the dosimeter for the required periods of time. Alternatively, the system of a planchet heated by an electrical current controlled by a thermocouple could be used, although this is an inferior embodiment to the preferred embodiment described in detail herein.

In addition to lithium fluoride, seven, six, and N, manganese-activated lithium borate and calcium sulfate (dysprosium) may be used in accordance with the method and apparatus of this invention.

This invention, thus, achieves the long sought objective of replacing the external oven annealing of thermoluminescent phosphors, such as lithium fluoride in its three states, lithium borate (manganese), and calcium sulfate (dysprosium) by a seven-stage read-out and anneal cycle. The seven-stage cycle of this invention eliminates previous signals to less than 0.03 percent residual after 50,000 mR exposure, reproduces sensitivity to better than ± 3 percent over 100 reuse cycles, reduces fading to acceptable levels and reduces the spread in dosimeters caused by variations in oven annealing. The elimination of the external annealing cycle for lithium fluoride and other phosphors, which results from this invention, should enhance the use of thermoluminescence as a convenient technique for routine use.

The invention in its broader aspects is not limited to the specific details shown and described, and departures may be made from such details without departing from the principles of the invention and without sacrificing its chief advantages.

What is claimed is:

1. A method of treating thermoluminescent dosimeters to enable reading of the dosimeters and to permit prompt reuse of the dosimeters, comprising the steps of:

heating a dosimeter to a predetermined first temperature;

maintaining the dosimeter at said first temperature for a predetermined first time interval;

heating the dosimeter to a predetermined second temperature;

maintaining the dosimeter at said second temperature for a predetermined second time interval;

immediately increasing the temperature of the dosimeter from said second temperature to a predetermined third temperature after said second time interval to anneal the dosimeter;

maintaining the dosimeter at said third annealing temperature for a predetermined third time interval; and cooling the dosimeter to a predetermined fourth temperature whereby the dosimeter can again be promptly reused for accurately determining radiation dosage.

2. A method as in claim 1 further including the step of measuring the light emissions of the dosimeter during the temperature rise of the dosimeter from the first to the second temperature and while the dosimeter is maintained at said second temperature.

3. A method as in claim 1 wherein the dosimeter is heated to said first temperature at a predetermined first heating rate and wherein the dosimeter is also heated to said second temperature at a predetermined second heating rate.

4. A method as in claim 3 wherein the dosimeter is heated to said annealing temperature at a predetermined third heating rate.

5. A method as in claim 4 wherein the dosimeter is cooled to said fourth temperature at a predetermined cooling rate.

6. A method as in claim 5 for treating lithium fluoride, lithium borate (manganese) or calcium sulphate (dysprosium) wherein the first temperature is within the range of about 120° C to about 150° C.

7. A method as in claim 6 wherein the dosimeter is maintained at said first temperature for 8 seconds.

8. A method as in cliam 5 for treating lithium fluoride, lithium borate (manganese) or calcium sulphate (dysprosium) wherein the second temperature is within the range of about 265° C to about 275° C.

9. A method as in claim 8 wherein the dosimeter is maintained at said second temperature for 8 seconds.

10. A method as in claim 5 for treating lithium fluoride, lithium borate (manganese) or calcium sulphate (dysprosium) wherein the annealing temperature is within the range of about 300° C to about 310° C.

11. A method as in claim 10 wherein the dosimeter is maintained at said annealing temperature for 18 to 20 seconds.

12. A method as in claim 5 for treating lithium fluoride, lithium borate (manganese) or calcium sulphate (dysprosium) wherein the fourth temperature is within the range of about 100° C to about 120° C.

13. A method as in claim 5 wherein said first heating rate is about 30° C per second.

14. A method as in claim 5 wherein said second heating rate is about 30° C per second.

15. A method as in claim 5 wherein said third heating rate is about 30° C per second.

16. A method as in claim 5 wherein the mean of said cooling rate is about 10° C per second with a maximum cooling rate of about 25° C per second from 300° C to 200° C.

17. A method as in claim 1 wherein said cooling step includes passing nitrogen gas over the dosimeter to aid cooling of the dosimeter.

18. A method as in claim 17 wherein the nitrogen is passed over the dosimeter at a flow rate of 7 S.C.F.H.

19. Apparatus for treating thermoluminescent dosimeters to enable reading of the dosimeters and to permit prompt reuse of the dosimeters, comprising:

a dosimeter heating element for receiving and heating the dosimeters;

a heat detector remotely positioned with respect to said heating element for sensing the temperature of said element;

feedback and comparator means in circuit with said heating element and said heat detector for enabling accurate control of the temperature of said heating element;

sequencer and reference program means in circuit with said feedback and comparator means for sequentially controlling the temperature of said heating element in accordance with a predetermined program; and means in operative relationship with said heating element for receiving light energy from a dosimeter heated by said element and for displaying information with respect to the irradiated condition of said dosimeter.

20. Apparatus as in claim 19 wherein said heating element is covered over a predetermined area thereof with a black coating and wherein said heat detector is an infra-red detector.

21. Apparatus as in claim 20 further including a second infra-red detector positioned to sense the ambient temperature adjacent said first detector and compensating means in circuit with said second detector for compensating for changes in ambient temperature.

22. Apparatus as in claim 19 wherein said display means include:

a photomultiplier positioned to receive light energy from a dosimeter positioned on said heating element;

converter means in circuit with said photomultiplier to convert an output signal from said photomultiplier to a pulse-train signal; and a display element coupled to said converter means for displaying said information.

23. Apparatus as in claim 19 further including a light source positioned to direct light onto said light receiving means and means in circuit with said light source for selectively illuminating said light source and for selectively enabling calibration of said display means.

* * * * *